US008747786B2

(12) United States Patent
Visser et al.

(10) Patent No.: US 8,747,786 B2
(45) Date of Patent: Jun. 10, 2014

(54) IONIC LIQUIDS AS TEMPLATING AGENTS IN FORMATION OF URANIUM-CONTAINING NANOMATERIALS

(75) Inventors: Ann E. Visser, Aiken, SC (US); Nicholas J. Bridges, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 89 days.

(21) Appl. No.: 13/606,558

(22) Filed: Sep. 7, 2012

(65) Prior Publication Data

US 2014/0070434 A1     Mar. 13, 2014

(51) Int. Cl.
    *C22B 60/00*     (2006.01)
(52) U.S. Cl.
    USPC .............. 423/11; 423/260; 423/261; 977/773
(58) Field of Classification Search
    None
    See application file for complete search history.

(56) References Cited

U.S. PATENT DOCUMENTS

| | | | |
|---|---|---|---|
| 4,158,616 | A | 6/1979 | Tomaja |
| 4,656,012 | A | 4/1987 | Jdid et al. |
| 6,379,634 | B1 | 4/2002 | Fields et al. |
| 7,919,023 | B2 | 4/2011 | Sornay et al. |
| 2008/0139710 | A1 | 6/2008 | Tsukada et al. |
| 2010/0021800 | A1 | 1/2010 | Yazami et al. |
| 2010/0129713 | A1 | 5/2010 | Yazami et al. |
| 2010/0199547 | A1 | 8/2010 | Reed |
| 2012/0043530 | A1 | 2/2012 | Badre et al. |

FOREIGN PATENT DOCUMENTS

WO     WO 2012/023992     2/2012

OTHER PUBLICATIONS

Anantha et al., "One-step synthesis of stable gold nanoparticles on ecofriendly iconic liquid." MRS Online Proc. Libr. (2011) 1386.
Campbell et al., Effects of Precursor and Support Variation in the Genesis of Uranium Oxide Catalysts for CO Oxidation and Selective Reduction of NO: Synthesis and Characterization. The Journal of Physical Chemistry B (2005) 109(7):2885-2893.
Bartunek, V., et al., Ianthanum trifluoride nanoparticles prepared using ionic liquids. J. Fluorine Chem. (2012) 135:358-361.
Bartunek, V., et al., Simple one-step preparation of cerium trifluoride nanoparticles. J. Fluorine Chem. (2011) 132:298-301.
Deshmukh et al., "One-pot electrochemical synthesis of palladium nanoparticles and their application in the Suzuki reaction." New J. Chem., (2011) 35:2747-2751.
Dewan et al., "Using hydrophilic Ionic liquid, [bmim]BF4-ethylene glycol system as a novel media for the rapid synthesis of copper nanoparticles." PloS One, (2012) 7:e29131.
Dupont et al., "Transition-metal nanoparticles in imidazolium ionic liquids: Recyclable catalysts for biphasic hydrogenation reactions" Journal of the American Chemical Society (2002) 124(16 ):4228-4229.
Fedorov et al , "Nanofluorides", J. of Fluorine Chemistry 132 (2011) 1012-1039
Fruchey et al., "Dynamics in Organic Ionic Liquids in Distinct Regions Using Charged and Uncharged Orientational Relaxation Probes" J. Phys. Chem. B (2010) 114: p. 2840-2845.
Goharshadi et al., "Preparation, structural characterization, semiconductor and photoluminescent properties of zinc oxide nanoparticles in a phosphonium-based ionic liquid," Mater. Sci. Semicond. Process., (2011) 14:69-72.
Goharshadi, et al., "Facile and green synthesis of ZnO nanostructures in a roomtemperature ionic liquid 1-hexyl-3-methylimidazolium bis(trifluoromethylsulfonyl)imide." Incirg. Mater. (2011) 47:379-384.
Goharshadl et al. "Fabrication of cerium oxide nanoparticles: Characterization and optical properties." J. Colloid Interface Sci., (2011) 356:473-480.
Gutkowski et al., "High-pressure phase behavior of the binary ionic liquid system 1-octyl-3-methylimidazolium tetrafluoroborat+carbon dioxide", J. of Supercritical Fluids, 39 (2006) 187-191.
Hao et al., "Self-assembled structures and chemical reactions in room-temperature ionic liquids", Current Opinions in Colloid & Interface Science 12 (2007) 129-137.
Hardacre et al., "Small angle neutron scattering from 1-alkyl-3-methylimidazolium hexafluorophosphate ionic liquids ([Cnmim][PF6], n=4, 6, and 8)" J. Chem. Phys. (2010) 133: p. 074510/1-074510/7
Kalviri et al., "Synthesis of Pd nanocrystals in phosphonium ionic liquids without any external reducing agents." Green Chem., (2011) 13:681-686.
Kim et al., "Shape-controlled synthesis of silver crystals mediated by imidazolium-based ionic liquids." Phys. Chem. Chem. Phys., (2011)13:16138-16141.
Kumar et al., "Uranium oxide nanoparticles dispersed inside the mesopores of MCM-48: synthesis and characterization", Microporous and Mesoporous Materials (2003) 66(2-3):157-167.
Lee et al., "Synthesis of Iron Oxide Nanoparticles with Control over Shape Using Imidazolium-Based Ionic liquids." ACS Appl. Mater. Interfaces, (2010) 2:756-759.
Li et al., "Fine structural and morphological control of rare earth fluorides REF3 (RE=La–Lu,Y) nano/microcrystals: microwave-assisted ionic liquid synthesis, magnetic and luminescent properties." Cryst. Eng. Comm, (2011)13:1003-1013.
Li et al., Facile synthesis and liminescence properties of highly uniform YF3:In3+(Ln=Eu, Tb, Ce, Dy) nanocrystals in ionic liquids. Powder Technol,, (2011) 214:211-217.
Li et al., "One-step, solid-state reaction of ZnO nanoparticles in the presence of ionic liquid." Mater. Sci. Semicond. Process., (2011)14:184-187.
Li et al., "Morphology-controlled ZnO particles from an ionic liquid precursor." Cryst. Eng. Comm., (2009) 11:2683-2687.
Lian et al., "Hematite (alpha—FE(2)0(3)) with Various Morphologies: Ionic Liquid-Assisted Synthesis, Formation Mechanism, and Properties" ACS Nano (2009) 3(11): p. 3749-3761.
Liu et al., "Ionicliquid-templated synthesis of mesoporous CeO2—TiO2 nanoparticles and their enhanced photocatalytic activities under UV or visible light." J. Photochem. Photobiol., A, (2011) 223:157-164.
Lorbeer et al., "Europium(III) Fluoride Nanoparticles from Ionic liquids: Structural, Morphological, and Luminescent Properties." Cryst. Growth Des., (2011) 11:1040-1048.

(Continued)

*Primary Examiner* — Steven Bos
(74) *Attorney, Agent, or Firm* — Dority & Manning, PA (57) ABSTRACT

A method for forming nanoparticles containing uranium oxide is described. The method includes combining a uranium-containing feedstock with an ionic liquid to form a mixture and holding the mixture at an elevated temperature for a period of time to form the product nanoparticles. The method can be carried out at low temperatures, for instance less than about 300° C.

27 Claims, 3 Drawing Sheets

(56) References Cited

OTHER PUBLICATIONS

Luska et al., "Functionalized Ionic liquids for the Synthesis of Metal Nanoparticles and their Applications in Catalysis." Chem. Cat. Chem.

Madhavaram et al., "Acetaldehyde reactions over the uranium oxide system." J. Catalysis (2004) 224(2):358-369.

Madu, et al., "Synthesis and characterization of gold nanoparticles using 1-alkyl•3•methylimidazollum based Ionic ilquids." Int. J. Phys. Sci., (2011) 6:635-640.

Mudring et al., "Nanoparticle synthesis in ionic liquids." ACS Symp. Ser., (2009) 1030:177-188.

Narita et al., "Preparation of ionic liquid-modified inorganic nanoparticles and their biomedical application." ACS Symp. Ser., (2010) 1038:103-114.

Pang et al., "Ionic liquid-assisted synthesis of silica particles and their application in drug release." Mater. Lett., (2010) 64:2509-2512.

Park et al., "1 D and 3D ionic liquid-aluminum hydroxide hybrids prepared via an ionotherma process," Adv. Func. Mat. (2007) 17(14):2411-2418.

Patil et al., "A novel one step synthesis of silver nanoparticles Using room temperature ionic liquid and their biocidal activity." C. R. Chim., (2011) 14:1122-1127.

Rousseau et al., "Synthesis and characterization of nanometric powders of $UO_2'30 x$, $(Th,U) O2+x$ and $(La,U)O2+x$" Journal of Solid State Chemistry (2009) 182(10):2591-2597.

Rubim et al., "Ionic liquids as recycling solvents for the synthesis of magnetic nanoparticles in a one step process." Phys. Chem. Chem. Phys. (2011) 13:(30):13558-64.

Schlereth et al., Adsorption and Reaction of $SO_2$ with a Polycrystalline $UO_2$ Film: Promotion of S—O Bond Cleavage by Creation of 0-Defects and Na or Ca Coadsorption. J. Phys. Chem. B (2005) 109(44):20895-20905.

Schubert et al., "Ionic liquids—novel tenside like materials for size controlled preparation of nanoparticles and safe-to-handle nanoparticle dispersions." (2010) CRC Press.

Shin et al., "Preparation of silver nanoparticles in ultrasonic vibration-induced nanodroplets of isopropyl alcohol in combination with ionic liquids." Bull. Korean Chem. Soc., (2011) 32:1583-86.

Singh et al., "A rapid and simple route for the synthesis of lead and palladium nanoparticles in tetrazolium based•ionic liquid." Spectrochim. Acta, Part A (2011) 78A:909-12.

Swadzaba-Kwasny et al., "Facile in situ synthesis of nanofluids based on ionic liquids and copper oxide clusters and nanoparticles" Dalton Transactions (2012) 41(1):219-227.

Tarasova et al., "Ionic liquids in the synthesis of nanoobjects." Russ. Chem. Rev., (2010) 79:463-477.

Taubert et al., "CuO nanoparticles from the strongly hydrated ionic liquid precursor (ILP) tetrabutylammonium hydroxide: Evaluation of the ethanol sensing activity." ACS Appl. Mater. Interfaces, (2012) 4:791-795.

Wang et al., "Synthesis of CoPt Nanorods in Ionic Liquids" J. Am. Chem. Soc. (2005) p. 5316-5317.

Wang et al., "Synthesis of uranium oxide nanoparticles and their catalytic performance for benzyl alcohol conversion to benzaldehyde" J. Mat. Chem. (2008) 16(10):1146-1152.

Wang et al., "Systematic Investigation on Morphologies, Forming Mechanism, Photocatalytic and Photoluminescent Properties of ZnO Nanostructures Constructed in Ionic Liquids" Inorg. Chem. (Washington, DC) (2008) 47:1443-1452.

Wang et al., "Apparent Molar Volumes and Electrical Conductance of Ionic Liquids C(n) mim Br (n=8, 10, 12) in Ethylene Glycol, N,N-Dimethylformamide, and Dimethylsulfoxide at 298.15 K" J. Chem. Eng. Data (2009) 54(12):3252-3258.

Wang et al., "The effect of 1—N:alkyl chain of ionic liquids [Cnmim]+Br— (n=2, 4, 6, 8) on the aspect ratio of ZnO nanorods: synthesis, morphology, forming mechanism, photoluminescence and recyclable photocatalytic activity" J. Mater, Chem. (2011) 21:15732-15740.

Xu et al., "Syntehsis of nickel hydroxide with different morphologies using an ionic liquid." Mater. Sci. Forum. (2010) 663-665.

Yao et al., "Ionic liquid-assisted synthesis, structural characterization, and photocatalytic performance of CdS nanocrystals." Mater. Chem. Phys., (2011) 130:1175-81.

Zhang et al., "Facile EG/ionic liquid interfacial synthesis of uniform•RE3+ doped $NaYF_4$ nanocubles." Chem. Comm., (2009) 46:592-94.

Zhang et al, "Interaction between the added long-chain ionic liquid 1-dodecyl-3-methylimadazolium tetrafluoroborate and Triton X-100 in aqueous solution", Colloids and Surfaces A: Physiochem. Eng. Aspects (2010) 372:182-189.

Zhao et al., "Ionic liquid-mediated synthesis of clean palladium nanoparticles for formic acid electrooxidation." Int. J. Hydrogen Energy, (2012) 37:51-58.

Zhou et al., Synthesis of very small $TiO_2$ nanocrystals in a room-temperature ionic liquid and their self-assembly toward mesoporous spherical aggregates. Journal of the American Chemical Society (2003) 125(49): p. 14960-14961.

Zhou et al., "Room-temperature ionic liquids as template to monolithic mesoporous silica with wormlike pores via a sol-gel nanocasting technique", Nano latters (2004) 4(3):477-481.

Zheng et al., "Microwave assisted synthesis of CuO nanostructures in ionic liquids." Adv. Mater. Res., (2011) 281:127-131.

Zhu et al., "Phase-maniputable syntheis of Cu-based nanomaterials using ionic liquid 1-butyl-3-methyl-imidazole tetrafluoroborate." Cryst. Res. Technol., (2010) 45:396-404.

Zhou et al., "Fast synthesis of nanostructured ZnO particles from an ionic liquid precursor tetrabutylammonium hydroxide." Curr. Opin. Solid State Mater. Sci., (2010) 14:75-82.

IONIC LIQUIDS AS TEMPLATING AGENTS IN FORMATION OF URANIUM-CONTAINING NANOMATERIALS

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

The uranium oxide systems have been heavily studied due to uranium use in commercial fuel fabrication as well as other applications such desulfurization, selective reduction of nitrogen oxide, and various applications involving reaction with organic compounds. In aqueous solutions, the U(VI) oxidation state predominates the chemistry through stabilizing trans-oxo ligands forming the uranyl cation $UO_2^{2+}$. In the solid state, there is minimal energy difference between the U(IV) and U(VI) oxidation states and as a result, both of these oxidation states are present in triuranium octoxide ($U_3O_8$), which is the most kinetically and thermodynamically stable form of uranium and occurs naturally in the mineral pitchblende.

Particularly in the case of uranium-based fuel, uranium dioxide ($UO_2$) is the preferred form of uranium due to the high fissile density of the U(IV) oxidation state in this compound. Traditionally, to form uranium dioxide, a uranium-bearing material such as uranyl nitrate hexahydrate, uranyl oxalate, or uranium peroxide dihydrate is first oxidized to form uranium trioxide ($UO_3$) followed by reduction at high temperature (e.g., about 700° C.) with hydrogen. Powders of the uranium dioxide can then be further treated as desired. For instance uranium dioxide powders can be enriched in $^{235}U$, mixed with any additional materials, such as binders, pore forming materials, or other oxides, pressed to compact and form a green body, sintered, and shaped to form fuel pellets. Small dimension particles are generally preferred for the powders to improve flowability, compaction, and sinterability of the materials.

Unfortunately, the uranium dioxide particle formation process is both expensive due to the high temperature requirements and dangerous due to the use of hydrogen gas.

Ionic liquids are a class of solvents that have been found useful as solvents in low temperature synthesis processes. These materials have produced unexpected results as they have been found to provide a solvation environment that is completely different from organic solvents that have been utilized in traditional synthesis. Ionic liquid solvents have also been examined for use in dissolving spent nuclear fuel and fission products so as to oxidize the metals as described by Fields, et al. in U.S. Pat. No. 6,379,634.

What are needed in the art are methods for formation of uranium oxides such as uranium dioxide that can be carried out at low temperature and by use of reducing agents that do not present the dangers of currently used hydrogen. Methods that can form nano-sized morphologies for use in a variety of applications would also be of benefit in the art.

SUMMARY

Aspects and advantages of the invention will be set forth in part in the following description, or may be obvious from the description, or may be learned through practice of the invention.

In one embodiment, disclosed is a method for forming nanoparticles that include a uranium oxide, for instance uranium dioxide. A process can include combining a uranium-containing feedstock with an ionic liquid to form a mixture. The mixture can be basic, for instance having a pH greater than about 8. The process can also include heating the mixture to a temperature of from about 100° C. to about 300° C. The mixture can be held at an elevated temperature for a period of time that is sufficient to form nanoparticles that include uranium oxide, for instance greater than about 12 hours.

These and other features, aspects and advantages of the present invention will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to a method for forming nanoparticles containing uranium oxide. More particularly, the method includes combining a uranium-containing feedstock with an ionic liquid to form a mixture and holding the mixture at an elevated temperature for a period of time to form the product nanoparticles. The method can utilize the ionic liquid not only as a solvent but also as a templating agent to form the desired nanoparticles in a controlled fashion. Beneficially, the method can be carried out at low temperatures, for instance less than about 300° C., for instance at a temperature of from about 100° C. to about 300° C., from about 120° C. to about 250° C., from about 130° C. to about 225° C., or from about 150° C. to about 200° C. In addition, the method can be carried out without the necessity of utilization of hydrogen as a reducing agent. The low temperatures of the method can provide a much more economical route for the formation of uranium oxide-containing nanoparticles as compared to previous methods.

In one embodiment, the uranium-containing feedstock can be a uranium salt. For instance, uranium ore as received from a refinery can be extracted by any suitable extraction agent to obtain a uranium salt feedstock. By way of example, uranium ore may be extracted by use of nitric acid to form a solution of uranyl nitrate hexahydrate ($UO_2(NO_3)_2 \cdot 6H_2O$). The uranyl nitrate can then be used as feedstock to form nanoparticles including a uranium oxide. Other extraction agents as are generally known may alternatively be utilized including, without limitation, sulfuric acid, phosphoric acid, hydrogen peroxide, and so forth to obtain the uranium-containing feedstock. Other examples of uranium salts as may be utilized as feedstock material can include, without limitation, uranyl acetate, uranyl oxalate, uranyl organophosphate compounds, uranium tetrafluoride, uranium chloride, uranyl sulfate, uranyl phosphate, ammonium uranate, etc. as well as mixtures of one or more uranium salts.

To form the uranium oxide-containing nanoparticles, the uranium-containing feedstock can be combined with an ionic liquid. As utilized herein, the term "ionic liquid" generally refers to an organic salt that is formed of anionic and cationic species and has a melting point of about 100° C. or less, for instance less than about 75° C., less than about 50° C., or less than about 25° C. Ionic liquids encompassed herein include mixtures of ionic liquids, which can include a mixture of two or more cations and/or two or more anions.

In one embodiment, the cation of the ionic liquid can be a bulky, asymmetric organic moiety including a polar aromatic headgroup, where most of the electrostatic charge is located, and a nonpolar alkyl side chain. In general, alkyl chains of an ionic liquid for use as described herein can include from 1 to about 12 carbons in the chain. Examples of ionic liquid cations can include, without limitation, ammonium or tetraalkyl ammonium cations, guanidinium cations, imidazolium cations, morpholinium cations, phosphonium cations, piperidinium cations, pyradazinium cations, pyrazinium cations, pyrazolium cations, pyridinium cations, pyrimidinium cations, pyrrolidinium cations, pyrrolium cations, pyrrolinium cations, sulfonium cations, thiazolium cations, oxazolium cations, and triazolium cations.

Typical anions of the ionic liquid can include, without limitation, borate anions, carbonate anions, carboxylate anions, chlorate anions, cyanate anions, halide anions, imide anions, nitrate anions, phosphate anions, sulfate and sulfonate anions, perfluoroalkyl β-diketonate anions, fluorohydrogenate anions, and fluorometallate anions.

The ionic liquid can be a heterocyclic compound having at least one positively charged nitrogen in the ring and at least one hydrogen atom on any ring atom that has been replaced with an alkyl group. For example, the ionic liquid can include complexes of an imidazolium cation and an anion. The imidazolium cation, for example, can have the following structure:

wherein $R_n$ is an alkyl group of n carbon atoms and n is from 1 to about 12. Different values of n may be used for the different alkyl groups on the ring. By way of example, the imidazolium cation may be selected from the following:

In one embodiment, the imidazolium cation can have the following structure:

wherein $R_n$ is an alkyl group of n carbon atoms and n is from 1 to about 12. Different values of n may be used for the different alkyl groups on the ring.

In one embodiment, the imidazolium cation can have the following structure:

wherein $R_n$ is an alkyl group of n carbon atoms and n is from 1 to about 12.

These cations may also be represented as [$C_n$mim] where n is from 1 to about 12. So, for example, the imidazolium cation may be selected from the following:

In another embodiment, the cation of the ionic liquid can include a quaternary ammonium group where the nitrogen is bonded to at least one alkyl group. By way of example, the cation for the ionic liquid may be selected from one of the following cations:

where $R_n$ is an alkyl group of n carbon atoms and n is from 1 to about 12, or where $R_n$ is an alkyl group of n carbon atoms and n from 1 to about 12 and also contains a functional group; and, $R_{H/R1}$ is either a hydrogen (H) or a methyl group ($CH_3$).

As such, in certain exemplary embodiments, the cation for the ionic liquid may be selected from one of the following cations:

For certain exemplary embodiments, the anion can be selected from the following anions:

The bis(trifluoromethylsulfonyl)imide anion may also be represented herein as [$NTf_2$]. The bis(perfluoromethylsulfonyl) imide anion may be represented herein as [BETI]. Other anions that may be used include, by way of example, $PF_6$, $BF_4$, triflate, halides, nitrates, alkyl sulfates, and others as well.

Accordingly, and by way of example only, ionic liquids based on the following complexes may be selected for use in certain exemplary embodiments:

Other combinations of these ions as well as combinations with additional ions may be used as well.

The above ionic liquids, including the various cations and anions described, are provided by way of example only. Using the teachings disclosed herein, one of skill in the art will understand that ionic liquids containing complexes of other cations and anions may also be used to form nanoparticles including uranium oxide.

The ionic liquid of the mixture can function in the formation process not only as a solvent, but also serve as a templating agent for the nascent nanoparticles. As such, the size and composition of the ionic liquid can be utilized to control and direct the morphology of the nanoparticles formed according to the process. Without wishing to be bound to any particular theory, it is believed that the intrinsic high charge and polarizability of the ionic liquid of the mixture creates both electrostatic and steric stabilization of the nascent nanoparticles, providing a templating function so as to limit the size of the particles formed during the formation of the uranium oxide from the uranium-containing feedstock. It is believed that the nanoparticles, e.g., oblong, star-shaped, or disk-shaped nanoparticles, are formed in ionic regions within the ionic liquid via oxygen interaction with a carbon of the cation, for instance the C-2 carbon of an imidazolium ring of the cation.

In addition to providing a route to size constrainment of the formed particles, the selection of the ionic liquid utilized in the formation process can alter the morphology of the formed particles. For instance, the particles can exhibit a spherical or ovoid shape or can be rod-like or plate-like in shape, with variations depending upon the ionic liquid chosen, e.g., the alkyl chain length(s) of the ionic liquid cation. As such, the morphology of the formed nanoparticles is not limited to any particular shape. For example, the formed nanoparticles can have a high aspect ratio, can be amorphous in overall shape, can be cone-shaped, star-shaped, and so forth.

By utilization of the disclosed process, morphology of the product nanoparticles can be controlled and thereby optimized for a particular use. For instance, the surface area to volume ratio of the formed particles can be varied as desired through modification of the ionic liquid templating agent, so as to provide a product exhibiting particularly desired characteristics. When considering utilization of the product nanoparticles in nuclear fuel applications, variation and control of the morphology of the nanoparticles can be utilized to alter the grain boundary characteristics of the sintered pellets, which can in turn improve the function of the formed pellets. For instance, the safety of the formed fuel rod can be improved by controlling the morphology and totality of the grain boundaries of the pellets, thereby decreasing stress induced on a cladding by the sintered fuel pellets during use.

In forming the mixture, the uranium-containing feedstock and the ionic liquid can generally be combined in a mole ratio of from about 1:2 to about 1:5, for instance from about 1:3 to about 1:4, or about 1:3.5 feedstock:ionic liquid, in one embodiment.

The mixture including the uranium-containing feedstock and the ionic liquid can generally be basic. For instance, the mixture can have a pH of greater than about 8, greater than about 9, greater than about 10, or greater than about 11. To obtain the desired basicity of the mixture, a pH adjustor can be included in the mixture. By way of example a strong or weak base can be included in the mixture as a pH adjustor. pH adjustors can include, without limitation, sodium hydroxide, potassium hydroxide, calcium hydroxide, lithium hydroxide, and so forth. The amount of pH adjustor included in the mixture can be tailored to provide the desired pH of the mixture according to standard practice. For instance, the mole ratio of the uranium-containing feedstock to the pH adjustor can be from about 1:1 to about 1:3, for instance about 1:2 in one embodiment.

Following formation of the mixture, the mixture can be held at an elevated temperature for a period of time during which the uranium oxide product forms and the reaction products are deposited in the form of nanoparticles. The uranium oxide product can be a mixture of uranium oxides or a single uranium oxide. For instance, the product nanoparticles can include one or more of $UO_2$, $UO_3$, and $U_3O_8$.

Beneficially, and as discussed previously, the elevated temperatures at which the formation can take place are much lower than those encountered in previous uranium oxide formation processes, for instance less than about 300° C., as previously discussed. The time necessary for product formation can generally be greater than about 12 hours. For example, the mixture can be held at an elevated temperature for a period of time from about 12 hours to about 72 hours, for instance from about 24 hours to about 60 hours.

Nanoparticles as may be formed by the process can generally have an average diameter of less than about 1000 nanometers (nm). For instance, product nanoparticles can have an average diameter of from about 10 nm to about 900 nm, from about 25 nm to about 800 nm, or from about 50 nm to about 700 nm.

In one embodiment, the uranium oxide-containing nanoparticles formed during the process can include uranium that is reduced as compared to the uranium of the feedstock. For example, the feedstock can be a uranium salt in which the uranium is in the U(VI) oxidation state and the product nanoparticles can include uranium dioxide in which the uranium is in the U(IV) oxidation state. While not wishing to be bound to any particular theory, it is believed that due to the basicity of the reaction mixture, the elevated temperatures during the process can lead to the formation of an intermediate in the reaction mixture, for example a carbine intermediate. The decomposition of the intermediate can provide a reducing atmosphere so as to reduce the uranium of the feedstock and prevent the reduced uranium from oxidizing to form $UO_3$ and/or $U_3O_8$.

In one embodiment, a reducing agent can be included in the feedstock. A reducing agent can be in any suitable form including solid, liquid, or gaseous. For example, one or more of a gaseous reducing agent such as $NO_R$, liquid reducing agents such as formic acid or ascorbic acid, or solid reducing agents such as uranium metal can be included in the feedstock. In one embodiment, a portion of the ionic liquid can function as a reducing agent.

Following formation and cooling, the product nanoparticles can be collected and washed (e.g., with water and/or isopropanol) and further processed as desired. For example, in one embodiment, the product nanoparticles can include uranium dioxide that can be enriched with regard to $^{235}U$ and further processed for use in fuel applications.

The $UO_2$ can be enriched according to any suitable process. For instance the uranium can be enriched by conversion with hydrofluoric acid to uranium tetrafluoride followed by oxidation with fluorine to yield $UF_6$. $UF_6$ can be enriched according to any suitable process including, without limitation, gas centrifugation, gas diffusion, laser techniques, atomic vapor laser isotope separation (AVLIS), molecular laser isotope separation (MLIS), separation of Isotopes by Laser Excitation (SILEX), aerodynamic techniques, electromagnetic isotope separation, chemical methods, plasma separation, and so forth. For fuel purposes, the enriched uranium can be low enriched uranium in which the $^{235}U$ content is less than 20% concentration. For instance the $^{235}U$ enrichment factor can range from about 3% to about 5%.

After processing to enrich the $^{235}U$ isotope content, the $UF_6$ can be converted back to form nanoparticles comprising the $UO_2$, for instance through utilization of the disclosed process. By way of example, the enriched $UF_6$ can be hydrolyzed by solution in water, ammonia can be added to precipitate ammonium diuranate, and the ammonium diuranate can be utilized as feedstock according to the disclosed process so as to reduce the uranium and form nanoparticles comprising the $UO_2$. In another process, gaseous $UF_6$, $CO_2$, and $NH_3$ can be combined in water to precipitate ammonium uranyl carbonate, which can then be utilized as a feedstock as described herein.

The enriched nanoparticles including the enriched uranium can then be processed according to known methodology including pressing, sintering, and shaping, to form the fuel pellets.

Of course, the nanoparticles include a uranium oxide as may be formed according to the disclosed process are in no way limited for use to fuel applications. For instance, the nanoparticles can be used in alternative applications including, without limitation, in shielding applications, for use as hardened ammunition, and as catalysts, for instance in desulfurization and $NO_x$ reduction.

The present disclosure may be better understood with reference to the Example, set forth below.

EXAMPLE

Ionic liquids including 1-octyl-3-methylimidazolium tetrafluoroborate ([$C_8$mim][$BF_4$]) and 1-dodecyl-3-methylimidazolium tetrafluoroborate ([$C_{12}$mim][$BF_4$]) were used as received from io-li-tec (Tuscaloosa, Ala.). Reagent grade depleted uranyl acetate dihydrate (Merck) was used without additional purification. All other chemicals used were obtained from Sigma Aldrich and used as received.

Uranyl acetate dihydrate, either [$C_8$mim][$BF_4$] or [$C_{12}$mim][$BF_4$], and sodium hydroxide as pH control were weighed and subsequently ground using a mortar and pestle. The mole ratio of uranyl acetate dihydrate to sodium hydroxide was 1:2. The mole ratio of uranyl acetate dihydrate to the ionic liquid was 1:3.5.

Following formation, each mixture was transferred into an open top glass vial and placed in a vented reaction vessel. The reaction vessel was closed and heated via heat tape wrapped around the outside of the vessel. The samples were heated to 150° C. for 48 hours. During the synthesis, the headspace was constantly purged by flowing air through the vessel. After 48 hours, the samples were allowed to cool to room temperature and were subsequently washed with water and isopropanol.

Powder x-ray diffraction analyses were performed with Bruker D8 Advance powder x-ray diffractometer. Samples for TEM analysis were prepared by placing a small amount of product in a glass vial and adding 8 milliliters of 2 wt. % sodium dodecyl sulfate in water. The solutions were sonicated for 15 seconds to disperse the solids within the solution. A drop of the sonicated solution was placed on a 3 millimeter copper grid and the water allowed to evaporate. TEM analysis was performed using a JEOL 2010 JIM transmission electron microscope operating at 200 kV.

Bulk powder x-ray diffraction analysis of the product from the [$C_8$mim][$BF_4$] synthesis corresponded to sodium uranium oxide hydrate ($Na_2U_2O.6H_2O$). Product morphologies were determined using TEM and elemental composition determined using electron dispersive spectroscopic analysis.

Figure 1:
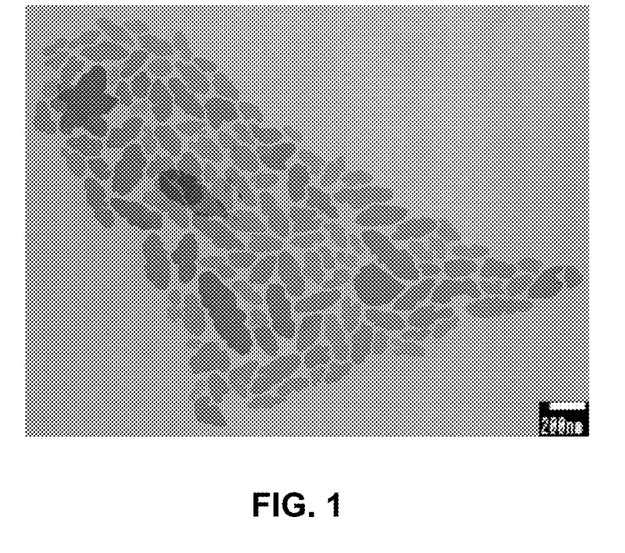
FIG. 1 is a transmission electron microscopy (TEM) image of uranium oxide-containing nanoparticles formed as described herein by use of 1-octyl-3-methylimidazolium tetrafluoroborate ($[C_8mim][BF_4]$) as templating agent.
Figure 2:
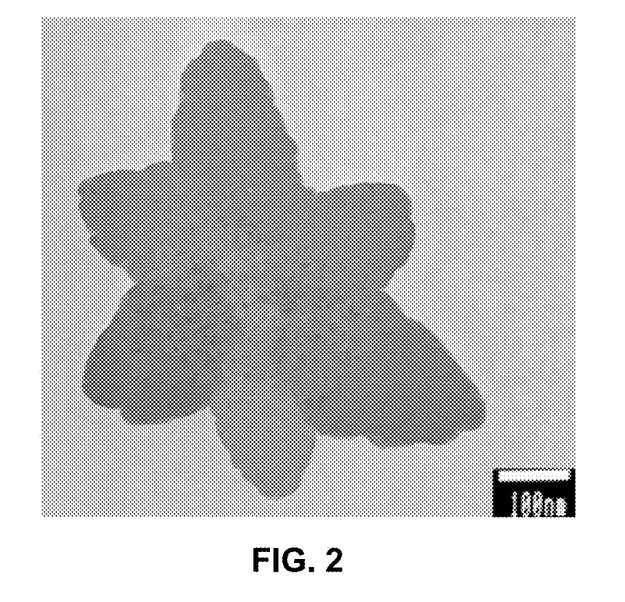
FIG. 2 is another TEM of uranium oxide-containing nanoparticles formed by use of 1-octyl-3-methylimidazolium tetrafluoroborate ($[C_8mim][BF_4]$) as templating agent.
Figure 3:
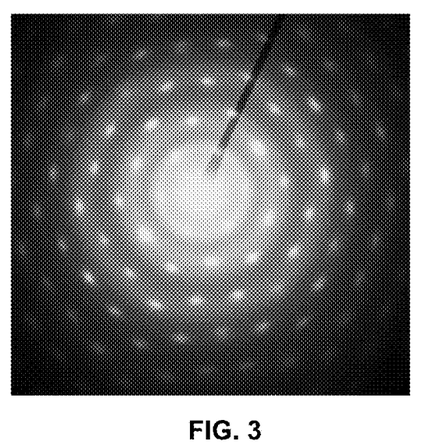
FIG. 3 is an electron diffraction pattern obtained from the nanoparticles of FIG. 2.

FIG. 1 and FIG. 2 show TEM images and FIG. 3 shows a diffraction pattern of uranium oxide products from this synthesis. The electron diffraction pattern acquired during TEM analysis of individual particles identified $UO_2$. Nanoparticles in both FIG. 1 and FIG. 2 are composed of uranium and oxygen. In FIG. 1, the particles are 50 to 300 nanometers wide and 100 to 700 nanometers in length. The diffraction pattern is a close match with $UO_2$ (cubic, $a_0$=5.47 Å). The diffraction pattern from the solids in FIG. 2, also identified as $UO_2$, is shown in FIG. 3.

Figure 4:
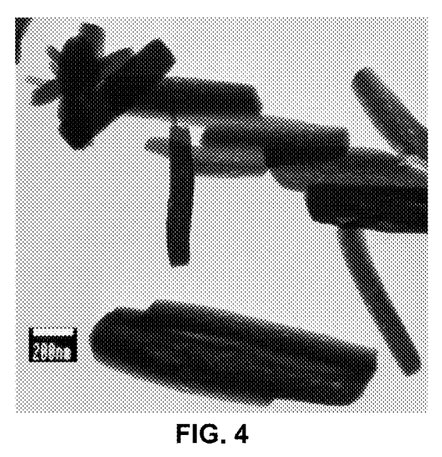
FIG. 4 is a TEM image of uranium oxide-containing nanoparticles formed as described herein by use of 1-dodecyl-3-methylimidazolium tetrafluoroborate ($[C_{12}mim][BF_4]$) as templating agent.
Figure 5:
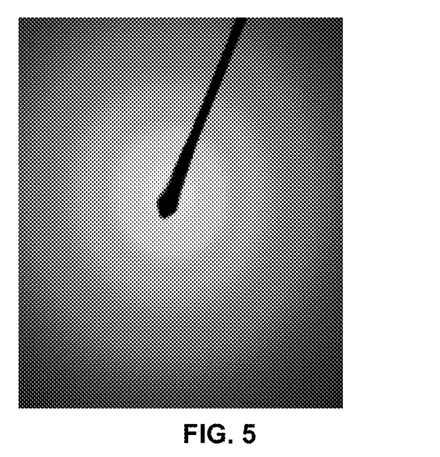
FIG. 5 is an electron diffraction pattern obtained from the nanoparticles of FIG. 4.
Figure 6:
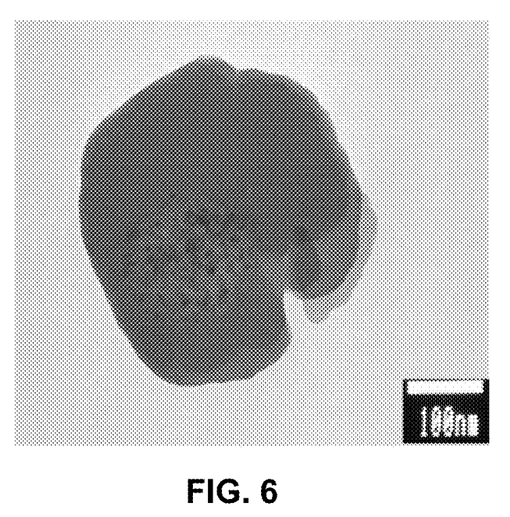
FIG. 6 is another TEM of uranium oxide-containing nanoparticles formed by use of $[C_{12}mim][BF_4]$ as templating agent.
Figure 7:
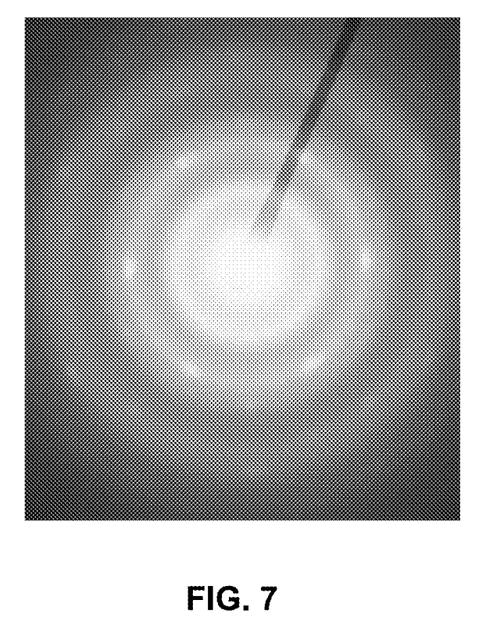
FIG. 7 is an electron diffraction pattern obtained from the nanoparticles of FIG. 6.

FIG. 4 and FIG. 6 show TEM images of products obtained from the $[C_{12}mim][BF_4]$ synthesis. The solids contained uranium and oxygen. Bulk x-ray diffraction analysis of the products revealed sodium diuranate. TEM identified some solids as amorphous and a lesser amount of solids as $UO_2$. The rods of FIG. 4 are amorphous and showed no spots in the electron diffraction pattern (FIG. 5). The TEM image of FIG. 6 is the minor product from the $[C_{12}mim][BF_4]$ synthesis. The electron diffraction pattern of this product shown in FIG. 7 revealed the solid to be cubic $UO_2$.

From the TEM analysis, the oblong $UO_2$ nanoparticles comprise the majority of the product formed in the $[C_8mim][BF_4]$ synthesis. In addition to the individual $UO_2$ nanoparticles of FIG. 1, the star-shaped crystals of FIG. 2 were grown in the $[C_8mim][BF_4]$ synthesis from multiple nucleation sites. Both of these solids were present in the $[C_8mim][BF_4]$ product. The disks and rods grown in the $[C_{12}mim][BF_4]$ synthesis suggest different growth mechanisms, particularly as the rods are amorphous and the disks were $UO_2$. The aspect ratio trend of the different ionic liquids appears to be smaller aspect ratios as the alkyl chain length of the ionic liquid increases, and the uranium oxide products formed were essentially two dimensional. Although the rod-shaped nanoparticles shown in FIG. 4 contain uranium, they are likely a byproduct of the reaction.

The bulk analysis and the single particle analysis of the products provided different answers with regard to product composition. Although the samples were washed with water and isopropanol before x-ray diffraction analysis, TEM samples were further 'washed' by sonicating in water with a surfactant. Furthermore, the samples could have dehydrated in the low vacuum used in the TEM analysis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming nanoparticles including a uranium oxide, the method comprising:
    combining a uranium-containing feedstock with an ionic liquid to form a mixture;
    heating the mixture to a temperature of from about 100° C. to about 300° C.; and
    holding the mixture at the temperature for a period of time sufficient to form the nanoparticles comprising a uranium oxide.

2. The method according to claim 1, wherein the mixture is basic.

3. The method according to claim 1, wherein the uranium-containing feedstock is a uranium salt.

4. The method according to claim 3, wherein the uranium salt is uranyl nitrate, uranyl acetate, uranyl oxalate, uranyl phosphate, uranium tetrafluoride, uranium chloride, uranyl sulfate, or mixtures thereof.

5. The method according to claim 1, wherein the ionic liquid includes a cation having a polar aromatic headgroup and a nonpolar alkyl side chain, the alkyl side chain including from 1 to about 12 carbon atoms.

6. The method according to claim 1, wherein the ionic liquid includes an imidazolium cation.

7. The method according to claim 6, wherein the imidazolium cation has a structure of:

wherein $R_n$ is an alkyl group of n carbon atoms and n is from 1 to about 12.

8. The method according to claim 1, wherein ionic liquid includes a tetrafluoroborate anion.

9. The method according to claim 1, wherein the mole ratio of the uranium-containing feedstock to the ionic liquid is from about 1:2 to about 1:5.

10. The method according to claim 1, the mixture further comprising a pH adjustor.

11. The method according to claim 10, wherein the pH adjustor is a strong base.

12. The method according to claim 11, wherein the pH adjustor is sodium hydroxide.

13. The method according to claim 10, wherein the mole ratio of the uranium-containing feedstock to the pH adjustor is from about 1:1 to about 1:3.

14. The method according to claim 1, the mixture further comprising a reducing agent.

15. The method according to claim 1, wherein the mixture is heated to a temperature of from about 150° C. to about 200° C.

16. The method according to claim 1, wherein the mixture is held at the temperature for a period of time of greater than about 12 hours.

17. The method according to claim 1, wherein the nanoparticles have an average diameter of from about 10 nanometers to about 900 nanometers.

18. The method according to claim 1, wherein the nanoparticles comprise uranium dioxide.

19. The method according to claim 1, wherein the nanoparticles comprise a mixture of two or more uranium oxides.

20. The method according to claim 1, further comprising enriching the uranium oxide.

21. The method according to claim 1, further comprising pressing, sintering, and shaping the nanoparticles to form a fuel pellet.

22. A method for forming nanoparticles comprising uranium dioxide, the method comprising:
combining a uranium salt with an ionic liquid and a pH adjustor to form a mixture, the mixture being basic, the ionic liquid including a cation having the structure of:

wherein $R_n$ is an alkyl group of n carbon atoms and n is from 1 to about 12, the mole ratio of the uranium salt to the ionic liquid being from about 1:2 to about 1:5, the mole ratio of the uranium salt to the pH adjustor being from about 1:1 to about 1:3;
heating the mixture to a temperature of from about 100° C. to about 300° C.; and
holding the mixture at the temperature for a period of time from about 12 hours to about 72 hours to form the nanoparticles comprising uranium dioxide.

23. The method according to claim 22, the ionic liquid including a tetrafluoroborate anion.

24. The method according to claim 22, wherein the pH adjustor is sodium hydroxide.

25. The method according to claim 22, wherein the mixture is heated to a temperature of from about 150° C. to about 200° C.

26. The method according to claim 22, wherein the nanoparticles comprise the uranium dioxide and a second uranium oxide.

27. The method according to claim 22, the mixture further comprising a reducing agent.

* * * * *